(No Model.)

A. W. McL. KEEN.
BELT FASTENER.

No. 514,998. Patented Feb. 20, 1894.

Witnesses

Inventor
Arthur W. McL. Keen
By his Attorney

UNITED STATES PATENT OFFICE.

ARTHUR WILLIAM McLEOD KEEN, OF MONTREAL, CANADA.

BELT-FASTENER.

SPECIFICATION forming part of Letters Patent No. 514,998, dated February 20, 1894.

Application filed August 7, 1893. Serial No. 482,623. (No model.)

*To all whom it may concern:*

Be it known that I, ARTHUR WILLIAM MCLEOD KEEN, of the city of Montreal, in the district of Montreal and Province of Quebec, Canada, have invented certain new and useful Improvements in Connections for Belting and the Like; and I do hereby declare that the following is a full, clear, and exact description of the same.

This invention relates to means for connecting together the meeting ends of leather belting and the like and has for its object to produce a much simpler connection and consequently one more easily effected or constructed, as well as being more economical than those heretofore made.

This invention consists in a metallic connection secured by fusion as between the two meeting edges of the ends of the belting and for full comprehension of the same reference must be had to the annexed drawings forming a part of this specification in which like symbols indicate corresponding parts and wherein—

Figure 1:
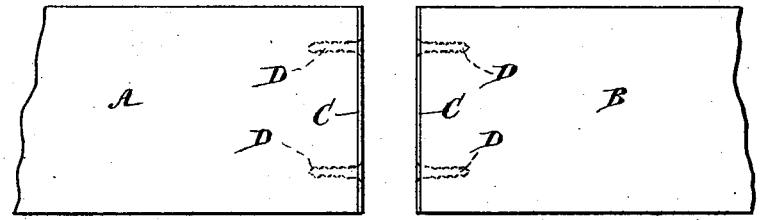
Figure 2:
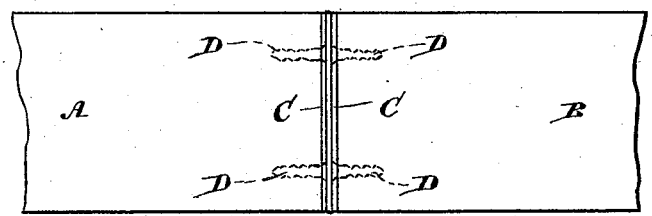
Figure 3:
Figure 4:

Figure 1 is a side elevation of two meeting ends of a belt to be connected; Fig. 2 a similar view showing such ends connected; Fig. 3 a longitudinal section of the parts and Fig. 4 an edge elevation of the same.

A B are two end portions of a length of belting to be connected together.

C C are facing strips of copper or similar metal apertured to accommodate screws D D passing through them into the edges of the ends and serving to hold such strips firmly in place. When the strips are thus secured in place the two ends are brought together and either welded, as by the electrical process, or otherwise connected, as by soldering, brazing or the like. By this form of connection a greater saving in the cost of the leather is effected since no extensive overlapping of the ends is required and it will also be seen that no lateral projections or connecting parts are exposed.

It will be noticed that by my arrangement a very narrow rigid connection is possible between the meeting edges of the belting and this is a very essential feature when the bending of the belting about a pulley is considered. I am unaware that such a narrow connection free from any overlap of the surfaces of the belting has ever been secured.

What I claim is as follows:

1. In combination with the meeting edges of belting or the like and such belting, the solid metallic perforated facing strips C C with internal means passing through and projecting laterally from such strips for securing them in place, and connected by fusion.

2. In combination with the meeting edges of the ends of belting as A, B, and such belting; the metallic facing strips C C with the retaining screws D D, located within the connection when formed, and united by fusion as set forth.

3. In combination with the meeting edges of belting and such belting; metallic strips on same, means passing through such strips for securing same in place, and the said means covered up or sealed in place, and the metallic strips connected together by fusion and being flush with the surfaces of said belting.

4. In combination with the meeting edges of belting; metallic strips on same at right angles to the length of belting, means passing through such strips in line with the length of belting for securing same in place, and the metallic strips connected together by fusion.

5. A fastening for a non-metallic belting consisting of solid metal end plates corresponding in thickness or depth to that of the cross section of the belting, secured to such ends by lateral holdfasts penetrating same, and connected by fusion.

ARTHUR WILLIAM McLEOD KEEN.

Witnesses:
WILL. P. McFEAT,
R. A. C. KIMBER.